United States Patent
Suzuki et al.

(10) Patent No.: US 6,918,566 B2
(45) Date of Patent: Jul. 19, 2005

(54) ACCESSORY HOLDER IN CABIN

(75) Inventors: Hisaya Suzuki, Shizuoka (JP); Masahiko Marusawa, Shizuoka (JP); Noriyuki Tsutsumi, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 22 days.

(21) Appl. No.: 10/466,284

(22) PCT Filed: Nov. 16, 2001

(86) PCT No.: PCT/JP01/10033

§ 371 (c)(1),
(2), (4) Date: Jul. 15, 2003

(87) PCT Pub. No.: WO03/041999

PCT Pub. Date: May 22, 2003

(65) Prior Publication Data

US 2004/0079853 A1 Apr. 29, 2004

(51) Int. Cl.$^7$ ............................................... F16M 13/00
(52) U.S. Cl. ....................... 248/549; 248/479; 248/900
(58) Field of Search ................................ 248/549, 479, 248/480, 481, 484, 900, 181.1, 181.2, 288.31; 359/872, 871, 873; 296/1.11; 52/785.12

(56) References Cited

U.S. PATENT DOCUMENTS

| | | | | |
|---|---|---|---|---|
| 4,435,042 A | * | 3/1984 | Wood et al. | 359/606 |
| 4,632,348 A | * | 12/1986 | Keesling et al. | 248/222.11 |
| 4,909,470 A | * | 3/1990 | Clark | 248/549 |
| 5,151,828 A | * | 9/1992 | Sugimura | 359/871 |
| 5,330,149 A | * | 7/1994 | Haan et al. | 248/549 |
| 5,377,949 A | * | 1/1995 | Haan et al. | 248/549 |

FOREIGN PATENT DOCUMENTS

| | | |
|---|---|---|
| JP | 1-176551 | 12/1989 |
| JP | 2-5349 | 1/1990 |
| JP | 7-47880 | 2/1995 |
| JP | 2000-185598 | 7/2000 |

* cited by examiner

Primary Examiner—Gwendolyn Baxter
(74) Attorney, Agent, or Firm—Oblon, Spivak, McClelland, Maier & Neustadt, P.C.

(57) ABSTRACT

A retaining apparatus (H) for retaining a room accessory such as a mirror assembly (4) comprises a base (1), a linear spring (2), and a base inner (3). The linear spring (2) includes linear parts (21) and a curved part (22), which are connected together with hairpin parts (23). A base (1) is attached between the linear parts (21) while a flange (39) provided at the base inner (3) is attached inside the curved part (22). The flange (39) is provided at a socket (38). A pivot (52) of a stay 5 of the mirror assembly (4) is pressed into the socket (38).

20 Claims, 5 Drawing Sheets

(a)

(b)

ACCESSORY HOLDER IN CABIN

TECHNICAL FIELD

The present invention relates to a room accessory retaining apparatus for retaining an accessory, e.g., a room mirror, a TV camera and others provided within a vehicle.

TECHNICAL BACKGROUND

Inside a vehicle, there provided a room mirror for watching the area behind. In recent years, room mirrors, TV cameras and others may be provided in the automobiles in order to improve the functions of automobiles. These accessories are attached to a part of the room, e.g., a wall, an instrument panel, etc. These accessories have the structure that they come off the installed location at the impact of a collision or other cases in order to prevent the accessories from damaging when the passenger's head hit it and large impact is applied thereto. However, under normal condition, the accessory is retained so that the accessory does not easily come off the installed location, and the accessory comes off only when an exceeding impact is applied thereto.

There is an assembly disclosed in Japanese Patent Laid-open No. HEI 7-61286 as an example of the conventional room accessory retaining apparatus having the above structure. This assembly comprises a base attached, e.g., to a car window. There is a retainer made of elastic member having two parallel retaining arms at the base, and the retainer elastically retains a coupler. The coupler has a long conic protrusion provided, and the retainer retains the coupler by inserting the protrusion. Then, the rearview mirror assembly retains by connecting the stay to the coupler.

Further, in order to install the base to the coupler, the coupler slides on the base so that the protrusion of the coupler is inserted in the two parallel retaining arms of the retainer. Next, the coupler is rotated and then since the protrusion is long conical, the retaining arms are pressed in the direction opposite to the base. Then, at this point, the retaining arms compress the retainer and the protrusion of the coupler is pressed to the base. In the above-described manner, the coupler is installed to the retainer so that the rearview mirror assemblies are retained by the base.

In such an assembly, the retaining apparatus can be constituted with small number of members such as a base, a coupler and a retainer. Further, in a case that the impact is applied to the side of the rearview mirror body, the coupler is rotated and the compression of the retainer is eliminated, and the coupler comes off the base. Further, in a case that the impact is applied to the rearview mirror assemblies from the front, the coupler is moved in the direction opposite to the direction that the coupler is inserted into the base and then the coupler comes off the base. In such ways, the coupler easily comes off the base using a rotation mode in a case of an impact from the side and a sliding mode in a case of an impact from the front. Accordingly, such assemblies are superior in releasing the impact and in preventing the static action.

However, in the assemblies disclosed in the above document, when the rearview mirror assemblies come off in the sliding mode, the coupler is moved in the direction opposite to the moving direction that the coupler is attached to the base. In this case, for example, when the retaining force for the rearview mirror assemblies is large, the minimum force for the rearview mirror assemblies coming off needs to be small. Therefore, the impact that the rearview mirror assemblies are released cannot be controlled unrelated with the retaining force for the rearview mirror.

It is an object of the present invention to provide a room accessory retaining apparatus capable of controlling the retaining force for an accessory unrelated with the impact that the accessory comes off in the sliding mode.

DISCLOSURE OF THE INVENTION

According to one aspect of the present invention, an accessory retaining apparatus for a vehicle includes a base fixed in a room, a base inner attached to the base over a linear spring, and a stay provided at an accessory body. The accessory body is retained by attaching the stay provided at the accessory body to the base inner. The linear spring has a pair of linear parts, a U-shaped curved part, and U-shaped hairpin parts connecting ends of the linear parts with the U-shaped curved part. The base has a width larger than a width between the linear parts and has a contact surface for receiving said pair of linear parts of said linear spring from a bottom of the base. The base inner has a flange held by the curved part of the linear spring. The linear parts of the linear spring is sliding on a contact surface of the base to be installed at the base. In a case that an impact is applied to the accessory body, the linear spring, the base inner and the accessory body slide on the contact surface of the base and the accessory body comes off.

BEST MODES EMBODYING THE PRESENT INVENTION

The present invention will be explained in detail with reference to the accompanied drawings.

Figure 1:
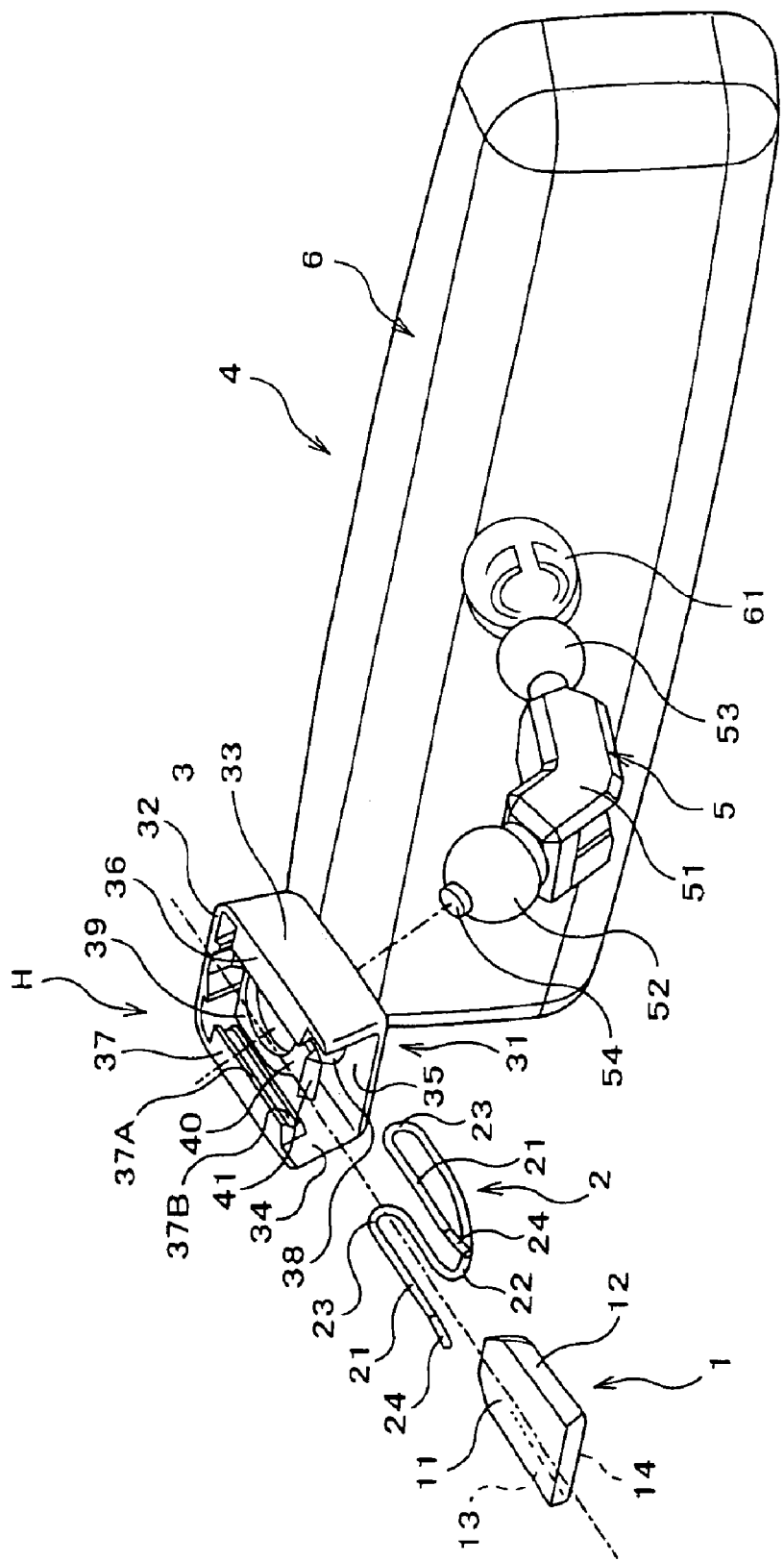
FIG. 1 is an exploded perspective view showing a room accessory retaining apparatus according to the present invention.
Figure 2:
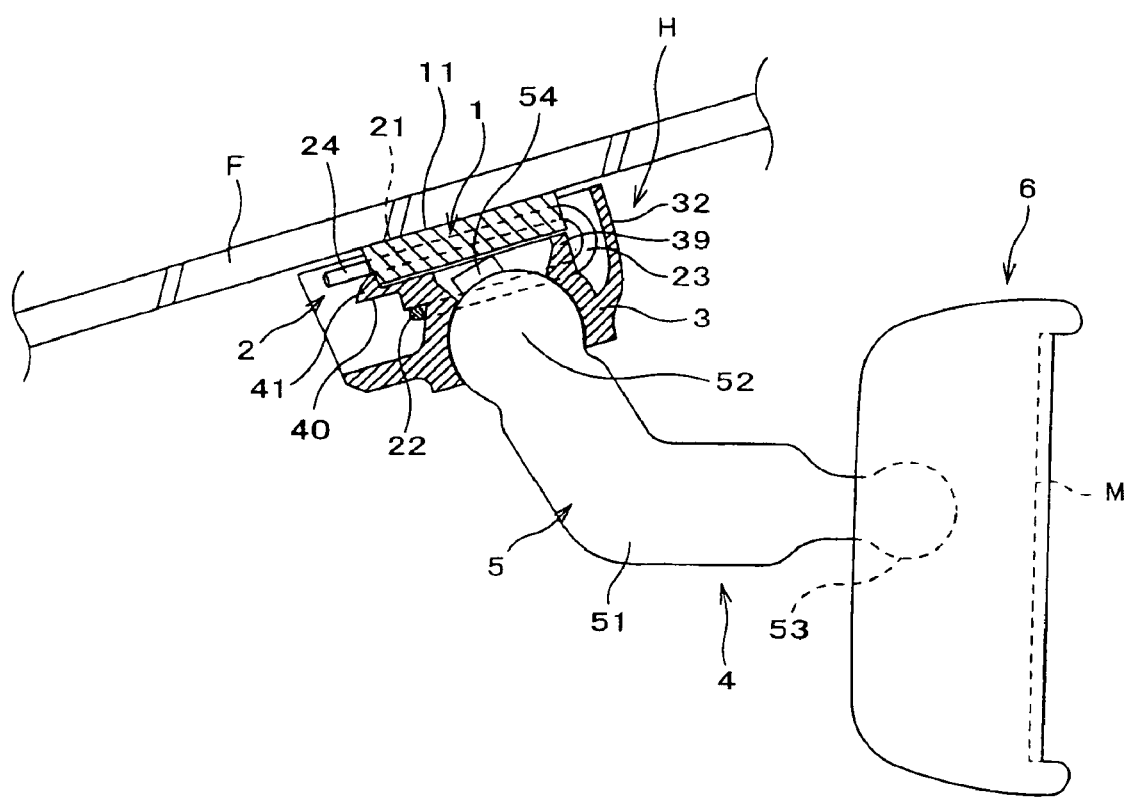
FIG. 2 is a side cross sectional view showing a room accessory retaining apparatus according to the present invention.
Figure 3:
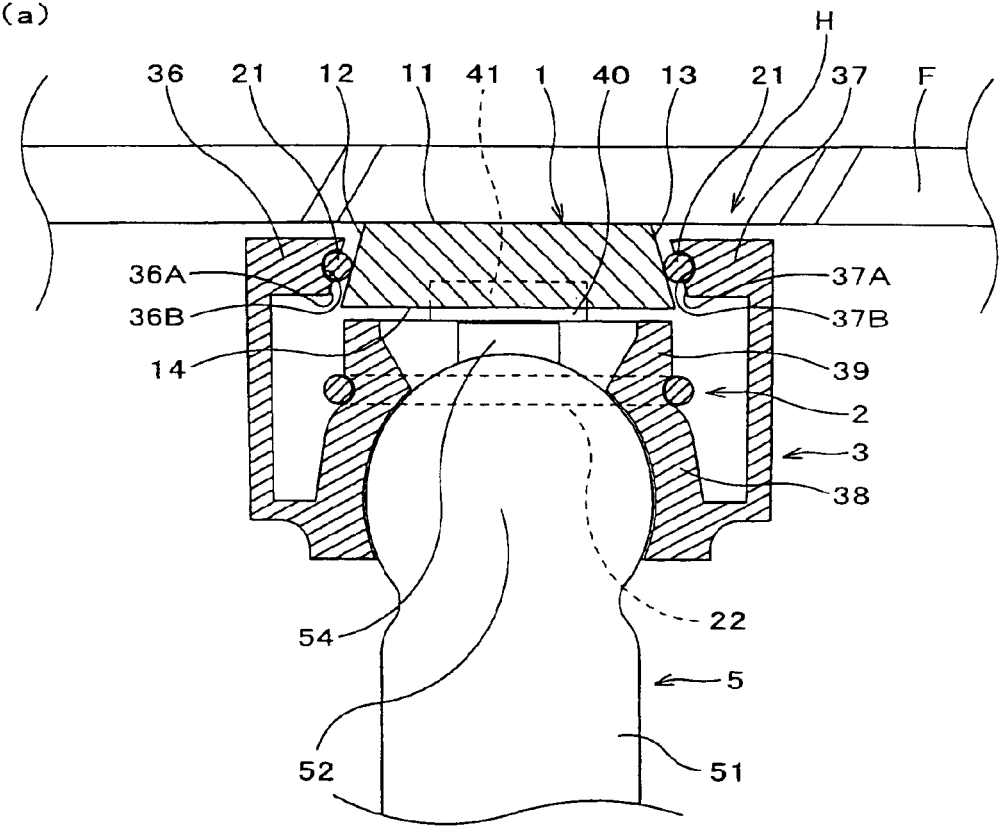
FIGS. 3(*a*) and 3(*b*) are vertical cross sectional views showing a room accessory retaining apparatus according to the present invention.
Figure 3:
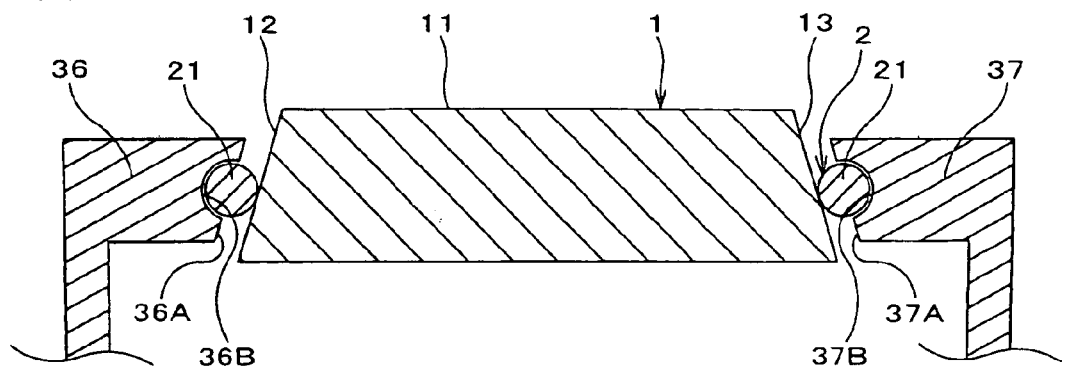

FIG. 1 is an exploded perspective view showing a room accessory retaining apparatus for an automobile according to the present invention. FIG. 2 is a cross sectional view thereof. FIG. 3 is a cross sectional view thereof.

As shown in FIGS. 1 to 3, a room accessory retaining apparatus H for an automobile of the present invention comprises a base 1, a linear spring 2, and a base inner 3.

The base 1 is a metal member having a substantially trapezoidal shape of a front cross section. Its upper surface is an attaching surface 11 to be attached to, e.g., a windshield of an automobile. There provided contact surfaces 12, 13 extending in oblique directions at two sides of the attaching surface 11. Lower sides of the contact surfaces 12, 13 are connected over a lower surface 14. The lower surface 14 is wider than the attaching surface 11, which makes the shape of the front cross section of the base 1 trapezoid.

The linear spring 2 is made of metal member and comprises a pair of linear parts 21 and a curved part 22. Further, one ends of the linear parts 21 are each connected to the curved part 22 with hairpin parts 23 which is for inverting them 180 degrees. Furthermore, the linear parts 21 comprise enlarging parts 24 for enlarging the entrance of the linear parts 21 at the other ends thereof in a case of the base 1 is inserted into the linear parts 21.

The base inner 3 is made of resin. The base inner 3 comprises a case 31 having openings at the upper and back portions. There formed a vertical wall 32 at the front of the case 31 and sidewalls 33, 34 at sides thereof. Further, there formed a back surface 35 at the lower portion of the case 31. Protruding streaks 36, 37 are formed integrally with the both sidewalls 33, 34 at the upper opening. The both sides of the protruding streaks 36, 37, facing to the contact surfaces 12, 13 of the base 1 are formed as inclined surfaces 36A, 37A, which forms a space between the protruding streaks 36, 37 becoming wide towards the lower end and which have an angle so as to be parallel with the contact surfaces 12, 13 of the base 1 when the base inner 3 is installed to the base 1.

Furthermore, there formed grooves 36B, 37B to which the linear parts 21 of the linear spring 2 are fitted. There also formed a socket 38 protruding to the inside of the base inner 3 at the center of the back surface 35 of the case 31. There provided a flange 39 to be held by the curved part 22 of the linear spring 2 at the upper end of the socket 38. Further, there provided a plate spring 40 protruding to the front at the front location of the flange 39 as shown in FIGS. 1, 2. The plate spring 40 has a protrusion 41 protruding upwards. The front surface of the protrusion 41 is a tapered face with the upper portion tilting to the back.

A mirror assembly 4 which is an accessory of the present invention will be attached and held to the base inner 3. The mirror assembly 4 comprises a stay 5 and a mirror case 6. The stay 5 has a stay body 51 having a curved side shape seen from the side and comprises a pivot 52 at one end thereof and an accessory body-side pivot 53 (hereinafter called a body-side pivot). The pivot 52 has a substantially the same shape as the inner shape of the socket 38 provided at the base inner 3 and is pressed into the socket 38 and held therein.

There provided a cylindrical stopper 54 protruding upwards at the upper end of the pivot 52. The stopper 54 is made to have a size so that when the mirror assembly 4 is held by the accessory retaining apparatus H, it is in contact with the base 1. When the rotation of the stay 5 of the mirror assembly 4 exceeds the permitted range under normal condition, the cylindrical head of the stopper 54 is strongly pressed and its movement is restricted. Therefore, the rotation of the mirror assembly 4 held by the accessory retaining apparatus H is prevented.

The mirror case 6 has a stay-side socket 61 formed at the back surface thereof. The stay-side socket 61 has an outer shape substantially the same as the body-side pivot 53 of the stay 5. The body-side pivot 53 of the stay 5 is strongly pressed to the stay-side socket 61 of the mirror case 6, which forms the mirror assembly 4. There attached a mirror M shown in FIG. 2 at the surface of the mirror case 6.

Figure 4:
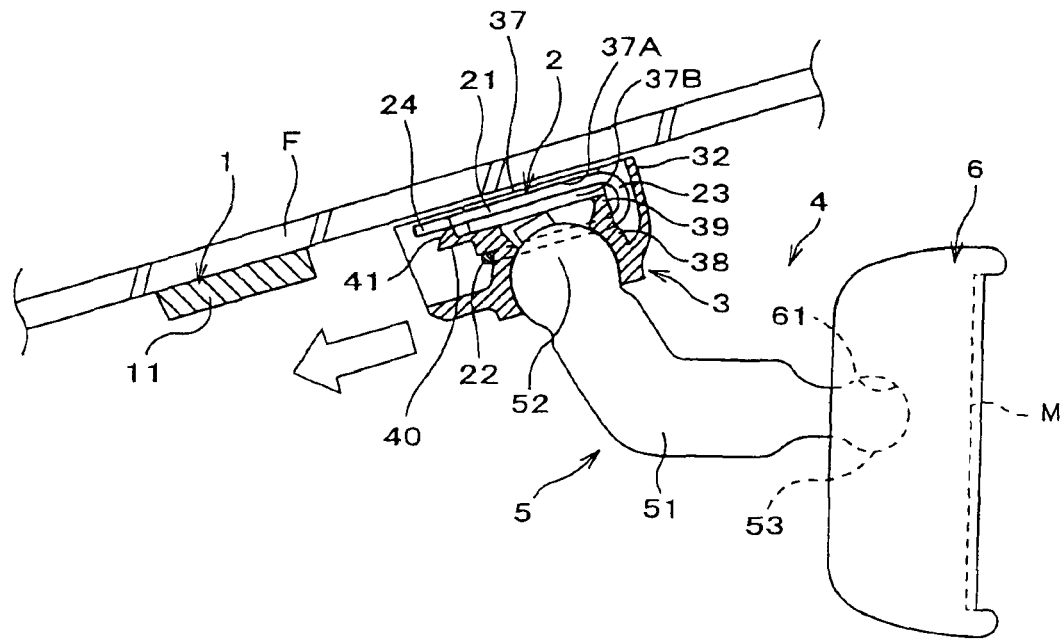
FIG. 4 is side view showing a case of installing a mirror assembly at a base.

Next, the installing process of the accessory retaining apparatus with thus described structure will be explained. First, as shown in FIGS. 3, 4, the base 1 is fixed to the windshield F using, e.g., an adhesive agent while the body-side pivot 53 of the stay 5 is pressed into the stay-side socket 61 of the mirror case 6 to form the mirror assembly 4. The pivot 52 of the stay 5 of the mirror assembly 4 is pressed into the socket 38 formed at the base inner 3. Next, the linear spring 2 is inserted from the front thereof into the case 31 so that the curved part 22 of the linear spring 2 is fitted into the flange 39 formed at the upper portion of the socket 38. At this point, since the flange 39 is squeezed by the curved part 22 of the spring 2, the stay 5 is rigidly fixed to the base inner 3, so that the retaining force for the mirror assembly 4 is properly maintained. Further, the linear parts 21 of the linear spring 2 are fitted into the grooves 36B, 37B formed at the inclined surfaces 36A, 37A of the protruding streaks 36, 37 as shown in FIG. 3(a) and FIG. 3(b).

After the mirror assembly 4 is attached to the base inner 3, the base inner 3 slides on the base 1 from the back thereof and attached thereto. In a case that the base inner 3 is attached to the base 1, the linear parts 21 of the linear spring 2 slide on the contact surfaces 12, 13 of the base 1 while touching thereto. It should be noted that since the enlarging parts 24 are provide at the other ends (tip) of the linear parts 21, the linear parts 21 are easily inserted into the base 1. While the linear parts of the linear spring 2 slide on the contact surfaces 12, 13, the plate spring 40 is distorted so that the protrusion 41 provided at the front of the flange 39 is moved downwards.

Here, the linear parts 21 of the linear spring 2 attached to the base inner 3 slide along the contact surfaces 12, 13 of the base 1 while sliding thereto and both the base 1 and the linear spring 2 are made of metal. Therefore, the friction coefficients between the contact surfaces 12, 13 and the linear parts 21 of the linear spring 2 are very small, so that the base inner 3 can smoothly slide thereon. Further, because the base 1 and the linear spring 2 are made of metal, they are hardly transformed due to heat under the normal circumference, so that the change of the shape of the base 1 and the linear spring 2 can adequately be prevented.

Figure 5:
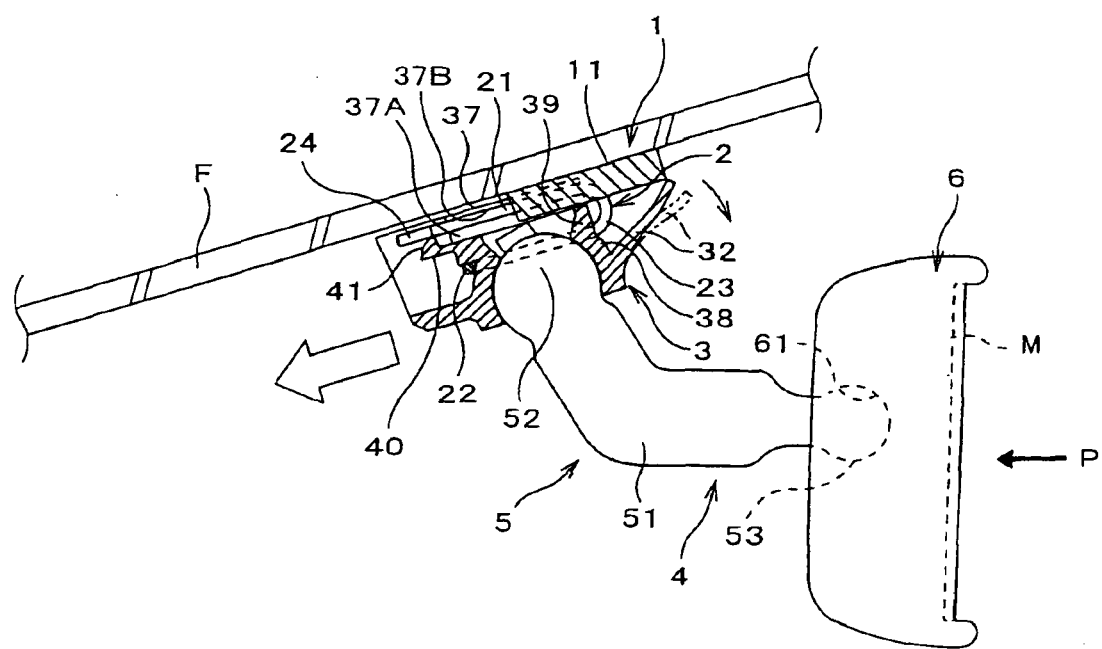
FIG. 5 is a side view showing a case of preventing an impact.

Next, as shown in FIG. 5, as the base inner 3 keeps sliding, the protrusion 41 provided at the tip of the flange 39 exceeds the base 1. Then, the protrusion 41 is moved upward due to the restoring force of the plate spring 40 and stopped at the rear surface of the base 1. Accordingly, when the base inner 3 is attached to the base 1, the mirror assembly 4 is fixed and held thereto. At the point, as shown in FIG. 3, the linear parts 21 of the linear spring 2 is located at the upper part of the contact surfaces 12, 13 of the base 1, and the curved part 22 is arranged at the lower part of the flange 39. The linear parts 21 and the curved part 22 of the linear spring 2 are integrally connected with the hairpin parts 23 as shown in FIG. 1, FIG. 4, FIG. 5, so that the base 1 and the flange 30 of the base inner 3 are squeezed by the elasticity of the linear spring 2.

Here, the flange 39 of the base inner 3 is provided at the upper end of the socket 38 near the bottom surface of the base 1, so that the space between the linear parts 21 and the curved part of the linear spring 2 can be narrowed and therefore the bend of the hairpin parts 23 can be made small.

Further, as shown in FIGS. 3(a), 3(b), the front cross section of the base 1 is trapezoid becoming wider towards the lower end, and the inclined surfaces 36A, 37A of the protruding streaks 36, 37 of the base inner 3 are formed so that the space between the surfaces becomes wider towards the lower end. Accordingly, the base inner 3 can be received by the contact surfaces 12, 13 unless the force acting on the base inner 3 dropping downwards is not against the elasticity of the linear spring 2. Therefore, the retaining force for the mirror assembly 4 attached to the base inner 3 can adequately maintained, and the mirror assembly 4 can be prevented from dropping.

Next, the operation in a case that the base inner 3 is dropped from the base 1 when the mirror case 6 receives the large impact will be explained.

For example, in a case of a car accident, when a passenger hits the mirror case 6 from the front, as shown in FIG. 5, the mirror case 6 receives the large impact P. At this point, owing to the stopper 54 provided on the top of the pivot 52 of the stay 5, the stay 5 is perpendicular to the sliding direction of the base inner 3 and the rotation of the stay 5 around the axis along to the substantially horizontal direction can be prevented. Accordingly, when the mirror case 6 receives the impact P, the impact P linearly acts on the base inner 3, and while the linear parts 21 of the linear spring 2 slide along the contact surfaces 12, 13 of the base 1, the linear spring 2, the base inner 3 and the mirror assembly 4 are moved to the front. Here, since the base 1 and the linear spring 2 are both made of metal, the friction due to sliding between them is small, so that the linear spring 2, the base inner 3 and the mirror assembly 4 can easily be moved. As the linear spring 2, the base inner 3 and the mirror assembly 4 are moved to the front, the vertical wall 32 of the base inner 3 is in contact with the base 1. Then, the vertical wall 32 of the base inner 3 is broken and the base inner 3 is moved to the front and dropped.

Accordingly, when the base inner 3 comes off, the vertical wall is broken, so that minimum of the impact in a case of the mirror assembly 4 coming off can easily be controlled by controlling the strength of the vertical wall 32. Controlling the elasticity of the linear spring 2 controls the retaining force when the base inner 3 is installed to the base 1. Therefore, the retaining force for the mirror assembly 4 can be controlled in spite of the impact when the mirror assembly 4 comes off.

Further, the pivot 52 and the body-side pivot 53 are provided at the ends of the stay 5, respectively, and the pivot 52 is pressed into the socket 38 of the base inner 3 while the body-side pivot 53 is pressed into the stay-side socket 61 of the mirror case 6. Accordingly, when so-called static force acts on the mirror assembly 4, the mirror assembly 4 can be moved away by the rotation between the pivot 52 and the socket 38 and the rotation between the body-side pivot 53 and the stay-side socket 61.

Figure 6:
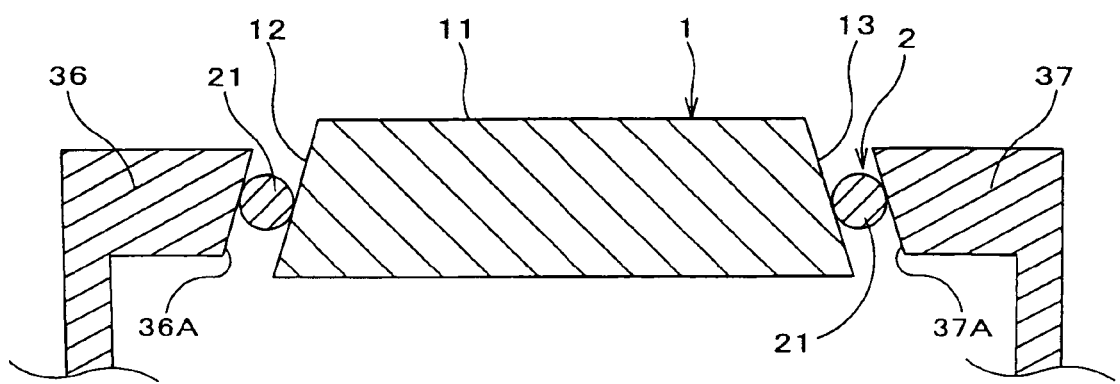
FIG. 6 is a vertical cross sectional view showing a room accessory retaining apparatus according to another embodiment of the present invention.

In the described embodiment, as shown in FIG. 3, the grooves 36B, 37B are formed at the inclined surfaces 36A, 37A of the protruding streaks 36, 37. Then, the linear parts 21 of the linear spring 2 are fit in the grooves 36B, 37B so that the linear spring 2 is held together with the contact surfaces 12, 13 of the base 1. However, the present invention is not limited to the above structure. For example, in other embodiment shown in FIG. 6, the grooves 36B, 37B are not formed in the inclined surfaces 36A, 37A of the protruding streaks 36, 37 and the linear parts 21 of the linear spring 2 can be held together with the contact surfaces 12, 13 of the base 1 and the inclined surfaces 36A, 37A.

Further, the base member is fixed to the windshield; however, for example, it can be fixed to the ceiling or other adequate location. Furthermore, the inner mirror is used an example of the accessory but for example, a TV camera, a cellular phone holder and others can be used.

A room accessory retaining apparatus according to an embodiment of the present invention includes a base fixed within a vehicle. A base inner is installed to the base with a linear spring. Installing a stay provided at the accessory body to the base inner retains the accessory body.

According to an embodiment of the present invention, at least one of the base and the linear spring is made of metal.

According to an embodiment of the present invention, a socket is formed at the base inner, and one end of the stay is attached to the accessory body and at the other end of the stay, a pivot to be pressed into the socket is formed.

In a room accessory retaining apparatus according to an embodiment of the present invention, a socket is formed at the base inner, and one end of the stay is attached to the accessory body and at the other end of the stay, a pivot to be pressed into the socket is formed.

In a room accessory retaining apparatus according to an embodiment of the present invention, the flange is formed at a head of the socket.

In a room accessory retaining apparatus according to an embodiment of the present invention, the flange is formed at a head of the socket.

In a room accessory retaining apparatus according to an embodiment of the present invention, a stopper is provided at the pivot so as to stop the rotation of the stay around the axis of the shaft perpendicular to the sliding direction and substantially parallel to the axis.

In a room accessory retaining apparatus according to an embodiment of the present invention, a stopper is provided at the pivot so as to stop the rotation of the stay around the axis of the shaft perpendicular to the sliding direction and substantially parallel to the axis.

In a room accessory retaining apparatus according to an embodiment of the present invention, a stopper is provided at the pivot so as to stop the rotation of the stay around the axis of the shaft perpendicular to the sliding direction and substantially parallel to the axis.

In a room accessory retaining apparatus according to an embodiment of the present invention, a stopper is provided at the pivot so as to stop the rotation of the stay around the axis of the shaft perpendicular to the sliding direction and substantially parallel to the axis.

In a room accessory retaining apparatus according to an embodiment of the present invention, an accessory body-side pivot is provided at one end of the stay, and a stay-side socket to which the accessory body-side pivot is pressed is formed at the accessory body.

FIELD OF TECHNICAL USE

As described above, the room accessory retaining apparatus for automobiles according to the present invention can be used as a retaining apparatus for retaining an accessory, e.g., a room mirror, a TV camera and others to be provided in a room.

What is claimed is:

1. An accessory retaining apparatus for a vehicle comprising:

a base fixed in a room;

a base inner attached to said base over a linear spring; and a stay provided at an accessory body;

said accessory body being retained by attaching said stay provided at said accessory body to said base inner;

said linear spring having a pair of linear parts, a U-shaped curved part and U-shaped hairpin parts connecting ends of said linear parts with said U-shaped curved part;

said base having a width larger than a width between the linear parts and having a contact surface for receiving said pair of linear parts of said linear spring from a bottom of said base;

said base inner having a flange held by said curved part of said linear spring;

said linear parts of said linear spring being sliding on a contact surface of said base to be installed at said base;

in a case that an impact is applied to said accessory body, said linear spring, said base inner and said accessory body sliding on the contact surface of said base and said accessory body coming off.

2. An accessory retaining apparatus according to claim 1, wherein at least one of said base and said linear spring is made of metal.

3. An accessory retaining apparatus according to claim 2, wherein a socket is formed at said base inner, and one end of said stay is attached to said accessory body, and a pivot to be pressed into said socket is formed at another end of said stay.

4. An accessory retaining apparatus according to claim 3, wherein said flange is formed at a head of said socket.

5. An accessory retaining apparatus according to claim 4, wherein a stopper is provided at said pivot so as to stop a rotation of said stay around an axis of a shaft perpendicular to a sliding direction of the base inner and substantially parallel to the axis.

6. An accessory retaining apparatus according to claim 5, wherein an accessory body-side pivot is provided at one end of said stay, and a stay-side socket to which said accessory body-side pivot is pressed is formed at said accessory body.

7. An accessory retaining apparatus according to claim 2, wherein an accessory body-side pivot is provided at one end of said stay, and a stay-side socket to which said accessory body-side pivot is pressed is formed at said accessory body.

8. An accessory retaining apparatus according to claim 3, wherein a stopper is provided at said pivot so as to stop a rotation of said stay around an axis of a shaft perpendicular to a sliding direction of the base inner and substantially parallel to the axis.

9. An accessory retaining apparatus according to claim 8, wherein an accessory body-side pivot is provided at one end of said stay, and a stay-side socket to which said accessory body-side pivot is pressed is formed at said accessory body.

10. An accessory retaining apparatus according to claim 3, wherein an accessory body-side pivot is provided at one end of said stay, and a stay-side socket to which said accessory body-side pivot is pressed is formed at said accessory body.

11. An accessory retaining apparatus according to claim 4, wherein an accessory body-side pivot is provided at one end of said stay, and a stay-side socket to which said accessory body-side pivot is pressed is formed at said accessory body.

12. An accessory retaining apparatus according to claim 1, wherein a socket is formed at said base inner, and one end of said stay is attached to said accessory body, and a pivot to be pressed into said socket is formed at another end of said stay.

13. An accessory retaining apparatus according to claim 12, wherein said flange is formed at a head of said socket.

14. An accessory retaining apparatus according to claim 13, wherein a stopper is provided at said pivot so as to stop a rotation of said stay around an axis of a shaft perpendicular to a sliding direction of the base inner and substantially parallel to the axis.

15. An accessory retaining apparatus according to claim 14, wherein an accessory body-side pivot is provided at one end of said stay, and a stay-side socket to which said accessory body-side pivot is pressed is formed at said accessory body.

16. An accessory retaining apparatus according to claim 13, wherein an accessory body-side pivot is provided at one end of said stay, and a stay-side socket to which said accessory body-side pivot is pressed is formed at said accessory body.

17. An accessory retaining apparatus according to claim 12, wherein a stopper is provided at said pivot so as to stop a rotation of said stay around an axis of a shaft perpendicular to a sliding direction of the base inner and substantially parallel to the axis.

18. An accessory retaining apparatus according to claim 17, wherein an accessory body-side pivot is provided at one end of said stay, and a stay-side socket to which said accessory body-side pivot is pressed is formed at said accessory body.

19. An accessory retaining apparatus according to claim 12, wherein an accessory body-side pivot is provided at one end of said stay, and a stay-side socket to which said accessory body-side pivot is pressed is formed at said accessory body.

20. An accessory retaining apparatus according to claim 1, wherein an accessory body-side pivot is provided at one end of said stay, and a stay-side socket to which said accessory body-side pivot is pressed is formed at said accessory body.

* * * * *